US012737406B2

(12) United States Patent
Sutherland et al.

(10) Patent No.: US 12,737,406 B2
(45) Date of Patent: Sep. 15, 2026

(54) ACCELERATED DOCUMENT CATEGORIZATION USING MACHINE LEARNING

(71) Applicant: Sartorius Stedim Data Analytics AB, Umeå (SE)

(72) Inventors: Alexander Sutherland, Umeå (SE); Rickard Sjögren, Röbäck (SE); Astrid Stehl, Göttingen (DE)

(73) Assignee: Sartorius Stedim Data Analytics AB, Umeå (SE)

( * ) Notice: Subject to any disclaimer, the term of this patent is extended or adjusted under 35 U.S.C. 154(b) by 1316 days.

(21) Appl. No.: 17/212,239

(22) Filed: Mar. 25, 2021

(65) Prior Publication Data

US 2022/0309089 A1 Sep. 29, 2022

(51) Int. Cl.
*G06F 16/35* (2025.01)
*G06F 18/2431* (2023.01)
(Continued)

(52) U.S. Cl.
CPC .......... *G06F 16/35* (2019.01); *G06F 18/2431* (2023.01); *G06F 40/30* (2020.01); (Continued)

(58) Field of Classification Search
CPC ...... G06N 20/00; G06F 40/30; G06F 18/2431
See application file for complete search history.

(56) References Cited

U.S. PATENT DOCUMENTS 8,713,007 B1 * 4/2014 Korolev ................. G06N 20/00 707/729
10,824,815 B2 * 11/2020 Leibovitz ................ G06F 40/30
(Continued)

FOREIGN PATENT DOCUMENTS

CN 109446321 A 3/2019
CN 109902175 A 6/2019

OTHER PUBLICATIONS

Li et al., DeepPatent: patent classification with convolutional neural networks and word embedding, Sep. 6, 2018, Scientometrics, vol. 117 (Year: 2018).*

(Continued)

*Primary Examiner* — David Yi
*Assistant Examiner* — Andrew Bracero
(74) *Attorney, Agent, or Firm* — Harrity & Harrity, LLP

(57) ABSTRACT

A computer-implemented method is provided. The method may comprise: obtaining at least one document to be classified; classifying, using a machine learning model including an artificial neural network (ANN) and an attention mechanism, the at least one document into at least two classes; determining, for each of the at least one document, a confidence value of the classifying, based on one or more outputs of one or more nodes comprised in the ANN; assigning, to each of the at least one document, based at least in part on the confidence value, one of at least two categories that are associated with different degrees of credibility of the classifying; and providing for display one or more of the at least one document with: the assigned category and attention information that indicates significance of one or more parts of each document provided for display in the classifying of said document.

20 Claims, 9 Drawing Sheets

(51) Int. Cl.
*G06F 40/30* (2020.01)
*G06N 3/04* (2023.01)
*G06N 20/00* (2019.01)

(52) U.S. Cl.
CPC ............... *G06N 3/04* (2013.01); *G06N 20/00* (2019.01); *G06F 2216/11* (2013.01)

(56) References Cited

U.S. PATENT DOCUMENTS

| | | | | |
|---|---|---|---|---|
| 2020/0074269 | A1* | 3/2020 | Trygg | G06F 17/18 |
| 2020/0265301 | A1* | 8/2020 | Burger | G06N 3/084 |
| 2020/0356723 | A1* | 11/2020 | Fume | G06F 18/2321 |
| 2020/0387675 | A1 | 12/2020 | Nugent et al. | |

OTHER PUBLICATIONS

Shamsi, "Development of a machine learning-based model to autonomously estimate web page credibility", 2020 (Year: 2020).*
Miculicich et al., "Document-Level Neural Machine Translation with Hierarchical Attention Networks", Oct. 1, 2018 (Year: 2018).*
Kandimalla et al.; "Large Scale Subject Category Classification of Scholarly Papers with Deep Attentive Neural Networks" (Year: 2021).*
Wu et al.; CiteSeerX-2018: A Cleansed Multidisciplinary Scholarly Big Dataset; (Year: 2018).*
Yang et al; "Hierarchical Attention Networks for Document Classification" (Year: 2016).*
Li et al.; "DeepPatent: patent classification with convolutional neural networks and word embedding"; (Year: 2017).*
Miculicich et al; "Document-Level Neural Machine Translation with Hierarchical Attention Networks"; (Year: 2018).*
Shamsi; "Development of a machine learning-based model to autonomously estimate web page credibility"; (Year: 2020).*
Klein et al., "OpenNMT: Open-Source Toolkit for Neural Machine Translation" (Year: 2017).*
Manning et al., "The Stanford CoreNLP Natural Language Processing Toolkit" (Year: 2014).*
Piroi et al., "CLEF-IP 2011: Retrieval in the Intellectual Property Domain" (Year: 2011).*
Yang et al., "Hierarchical attention networks for document classification." Proceedings of the 2016 conference of the North American chapter of the association for computational linguistics: human language technologies, 2016, 10 pages.
Devlin et al., "BERT: Pre-training of deep bidirectional transformers for language understanding", 2018, 16 pages.
Vaswani et al., "Attention is all you need", 31st Conference on Neural Information Processing Systems (NIPS 2017) 2017, 15 pages.
Mikolov et al., "Efficient Estimation of Word Representations in Vector Space", 2013, 12 pages.
Wikipedia, "fastText", en.wikipedia.org/wiki/FastText, Nov. 26, 2020, 2 pages.
Pennington et al., "GloVe: Global Vectors for Word Representation", 2014, 12 pages.
Pennington et al., "GloVe: Global Vectors for Word Representation", 2014, 3 pages.
Peters et al., "Deep contextualized word representations", 2018, 15 pages.
"Pretrained models", huggingface.co/transformers/pretrained_models.html, Mar. 25, 2021 (print date), 20 pages.
Bahdanau et al., "Neural Machine Translation by Jointly Learning to Align and Translate", 2015, 15 pages.
Apache License 2.0, "word2vec", Jul. 29, 2013, 5 pages.
Gal et al., "Dropout as a bayesian approximation: Representing model uncertainty in deep learning." Proceedings of the 33 rd International Conference on Machine Learning, 2016, 12 pages.
Guo et al., "On calibration of modern neural networks." Proceedings of the 34th International Conference on Machine Learning, PMLR, 2017, 14 pages.
Ribeiro et al., ""Why should I trust you?" Explaining the predictions of any classifier." Proceedings of the 22nd ACM SIGKDD international conference on knowledge discovery and data mining, 2016, 10 pages.
Lundberg et al., "A unified approach to interpreting model predictions." 31st Conference on Neural Information Processing Systems (NIPS 2017), 2017, 10 pages.

* cited by examiner

ACCELERATED DOCUMENT CATEGORIZATION USING MACHINE LEARNING

The application relates to a computer-implemented method, a system and a non-transitory computer-readable medium for accelerating document classification and/or categorization.

BACKGROUND

Keyword query-functionality is usually provided by a document database for retrieving documents relevant to a user's interest. For example, documents may be retrieved from the document database based on a query including one or more words, one or more phrases, or a combination thereof. The user often needs to review the search results to identify which of the retrieved documents are truly relevant for the user's interest. Further, in particular for retrieving documents from a huge number of documents, document classification techniques involving machine learning models for natural language processing (NLP) have been employed. For example, machine learning models with deep learning architecture based on artificial neural networks (ANNs) adapted to solve NLP problems are often employed in document classification and/or retrieval.

SUMMARY

A computer-implemented method is provided. The method may comprise: obtaining at least one document to be classified, the at least one document containing textual data; classifying, using a machine learning model, the at least one document into at least two classes, the machine learning model including an artificial neural network, ANN, and an attention mechanism and the machine learning model being trained using a training dataset comprising: a plurality of documents containing textual data; and information indicating which one of the at least two classes each one of the plurality of documents belongs to; determining, for each of the at least one document, a confidence value of the classifying, based on one or more outputs of one or more nodes comprised in the ANN, the one or more outputs being obtained from the classifying; assigning, to each of the at least one document, based at least in part on the confidence value, one of at least two categories that are associated with different degrees of credibility of the classifying; and providing for display one or more of the at least one document with: the one of the at least two categories assigned to each of the one or more of the at least one document; and attention information that indicates significance of one or more parts of each document provided for display in the classifying of said document using the machine learning model.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION OF EMBODIMENTS

Figure 1:
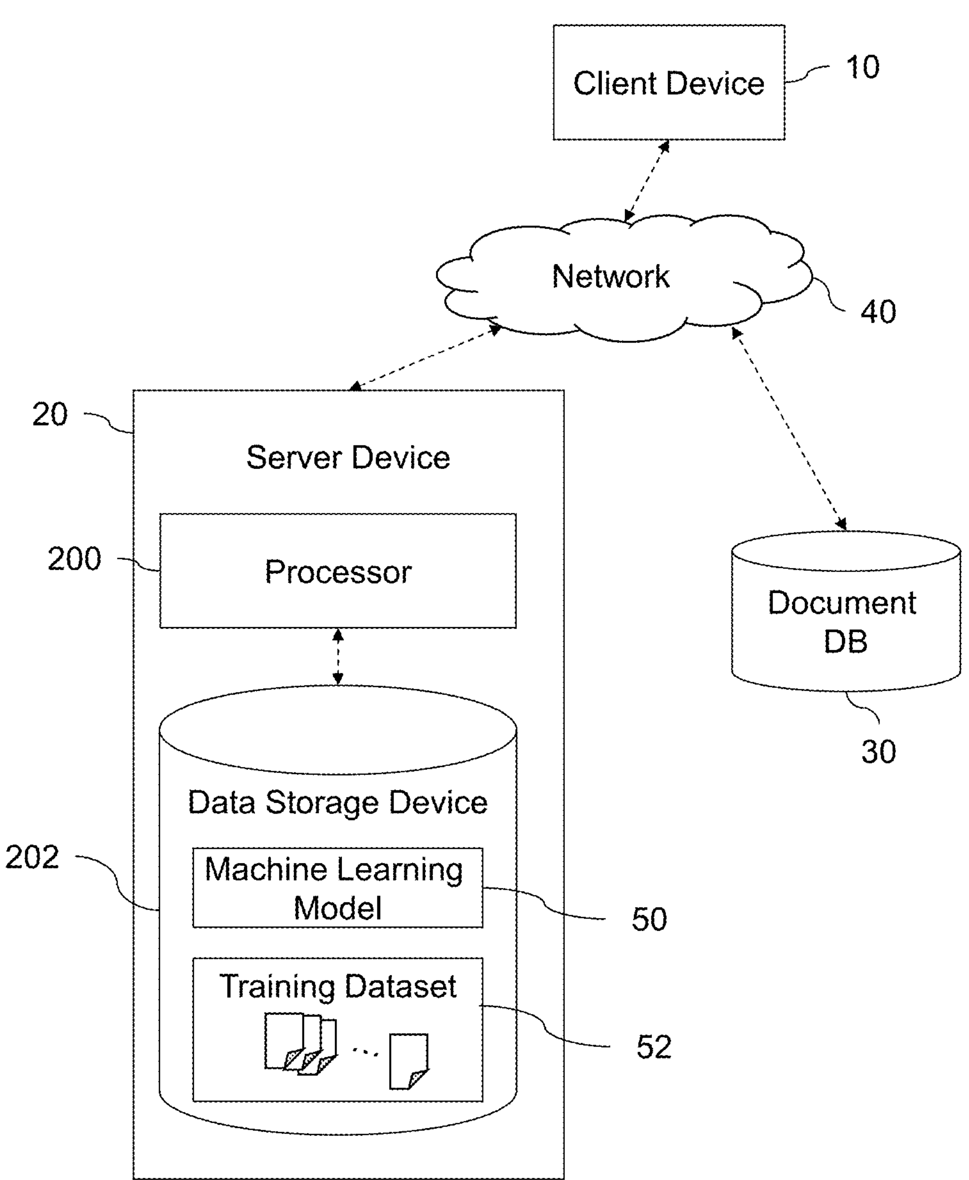
FIG. 1 shows a schematic diagram of an exemplary system that may include a system according to the present disclosure.

In the following text, a detailed description of examples will be given with reference to the drawings. It should be understood that various modifications to the examples may be made. In particular, one or more elements of one example may be combined and used in other examples to form new examples.

Overview

The present disclosure relates to accelerating document classification and/or categorization. The present disclosure further relates to supporting faster decision making with regards to one or more documents, for example, whether the documents are relevant for the interest of a particular entity such as an organization, corporation, research institute, etc.

The following detailed description of various aspects and exemplary embodiments of the present disclosure refers to classification and/or categorization of patent documents as a specific exemplary use case of the present disclosure. It should be noted, however, various aspects and exemplary embodiments of the present disclosure may be applied also to any other kind of documents containing textual data.

As is widely known, patents are key components to define intellectual property (IP) for businesses. It is therefore common for corporations to have patent monitoring processes in place where new patent documents are reviewed by domain experts to assess whether or not they are conflicting with their business interests. Most patent databases provide keyword query-functionality, meaning that based on certain technical words and phrases, and combinations thereof, patent documents are retrieved automatically. Although highly useful, the keyword-based query functions as stated above may be crude, in other words, they may produce many false positives, and human assessment may be needed to better define what is a relevant patent document based on the query. Since the number of patent applications filed is rapidly increasing, now counting in millions per year, the number of such false positives may grow as well, leading to increase of the time required by experts to manually sift through large collections of retrieved documents. In some circumstances, as will be described below, various aspects and embodiments of the present disclosure can accelerate, not fully automating, the selection by using machine learning-assisted decision support system trained on historical selections.

In natural language processing (NLP), attention-based classification approaches have recently become more common (see e.g., Yang, Zichao, et al. "Hierarchical attention networks for document classification." Proceedings of the 2016 conference of the North American chapter of the association for computational linguistics: human language technologies. 2016; Devlin, Jacob, et al. "BERT: Pre-training of deep bidirectional transformers for language understanding." arXiv preprint arXiv:1810.04805 (2018); Vaswani, Ashish, et al. "Attention is all you need." Advances in neural information processing systems 30 (2017): 5998-6008). An attention mechanism may allow for a degree of interpretability when examining model predictions by examining where the attention of the model focuses for a specific prediction. Being able to interpret the reasoning and nuances behind a prediction may be particularly necessary when a degree of accountability is involved, as blindly relying on a black box model can result in hard-to-identify systemic errors in model predictions that can be costly when working with a system in the long term. Accordingly, for example, in case of pragmatically integrating a deep learning model into day-to-day patent analysis, being able to understand the certainty and focus of a prediction may be required.

Determining if a patent document is relevant to IP interests of a corporation may be a time-consuming process. Analyzing a patent document may require highly trained patent experts to slowly and methodically analyze the information provided in the patent and reach a decision if the subject-matter of the patent document infringes on business interests of the corporation, is relevant for a new technological direction of the corporation, or is irrelevant to business interests of the corporation. Reducing the amount of time and cognitive effort required to sort a set of patent documents into relevant or irrelevant for the business interests of the corporation can allow experts to spend more time and energy on making strategic IP decisions and reduce the amount of expertise required to process patent documents.

According to an aspect, the problem relates to accelerating document classification and/or categorization. Further, in some circumstances, the problem may also relate to improving retrieval of data from a database.

The problem is solved by the features disclosed by the independent claims. Further exemplary embodiments are defined by the dependent claims.

According to an aspect, a computer-implemented method is provided. The method may comprise:

- obtaining at least one document to be classified, the at least one document containing textual data;
- classifying, using a machine learning model, the at least one document into at least two classes, the machine learning model including an artificial neural network, ANN, and an attention mechanism and the machine learning model being trained using a training dataset comprising:
  - a plurality of documents containing textual data; and
  - information indicating which one of the at least two classes each one of the plurality of documents belongs to;
- determining, for each of the at least one document, a confidence value of the classifying, based on one or more outputs of one or more nodes comprised in the ANN, the one or more outputs being obtained from the classifying;
- assigning, to each of the at least one document, based at least in part on the confidence value, one of at least two categories that are associated with different degrees of credibility of the classifying; and
- providing for display one or more of the at least one document with:
  - the one of the at least two categories assigned to each of the one or more of the at least one document; and
  - attention information that indicates significance of one or more parts of each document provided for display in the classifying of said document using the machine learning model.

In the present disclosure, the term "attention mechanism" may be understood as indicating a technique that mimics cognitive attention in an ANN. For example, with an "attention mechanism" in an ANN, the ANN may learn which part or parts of input data is or are more important than other part or parts of the input data. The "attention mechanism" may enhance the important part or parts of the input data and fade out the rest. Examples of an ANN with the "attention mechanism" may include, but are not limited to, hierarchical attention networks (see e.g., Yang, Zichao, et al. "Hierarchical attention networks for document classification." Proceedings of the 2016 conference of the North American chapter of the association for computational linguistics: human language technologies. 2016), Bidirectional Encoder Representations from Transformers (BERT, see e.g., Devlin, Jacob, et al. "BERT: Pre-training of deep bidirectional transformers for language understanding." arXiv preprint arXiv:1810.04805 (2018)) and Transformer (see e.g., Vaswani, Ashish, et al. "Attention is all you need." Advances in neural information processing systems 30 (2017): 5998-6008).

In the present disclosure, the "confidence value" of the classifying may be a numerical value representing how confident the machine learning model is regarding a classification result output by the machine learning model.

In some exemplary embodiments, the assigning of one of the at least two categories may be performed by specifying one or more threshold values for the confidence value and by comparing the one or more threshold values with the confidence value. For a specific example, in case of assigning one of two categories (e.g., credible and uncredible; confident and unconfident, etc.), a document may be assigned a category with a higher degree of credibility of the classifying if the confidence value for the classifying of the document exceeds a specified threshold value and the document may be assigned a category with a lower degree of credibility of the classifying if the confidence value is equal to or lower than the specified threshold value.

In various aspects and embodiments described herein, the "attention information" may be information obtained using the "attention mechanism" included in the machine learning model when classifying each document.

According to the various aspects and exemplary embodiments described herein, one or more parts of documents, which may be considered significant for the classification of the document, can be identified and visualized. This may reduce the amount of time required to identify whether a document contains information relevant to the interest of the user (e.g., whether a patent document contains subject-matter relevant to the business interests of a corporation given its previous interests). The various aspects and exemplary embodiments described herein can provide suggestions on which documents are classified into which groups with confidence values while also providing users insight into the decision-making process used by the machine learning model to reach the classification results.

Further, according to various aspects and exemplary embodiments described herein, decision making on which documents belong to which classes is not necessarily fully automated. This may be more advantageous as compared to techniques with fully automated classification using machine learning based classifiers, in case of solving document classification problems where false negatives and/or false positives are unacceptable, since a classifier will most likely never reach 100% recall. For example, in monitoring patent documents, missing one truly relevant patent document may have a big negative business impact. Further, there may also be an issue of accountability when using a fully automated system. In a business-critical activity such as IP-monitoring, it may not be clear who is responsible for a faulty decision when using a machine learning system that autonomously makes decisions, especially when it is widely known that such a system will most likely never be error-free.

In some exemplary embodiments, in the classifying, the machine learning model may perform a binary classification with a first class of relevant documents and a second class of irrelevant documents.

Further, in some exemplary embodiments, the one or more of the at least one document provided for display is or are assigned to a specified one of the at least two categories. The specified one of the at least two categories is associated with the lowest degree of credibility of the classifying. In other words, the document(s) assigned to the specified category (e.g., associated with a specified level of credibility of the classification) may be selected to be provided for display. For example, in case one of two categories (e.g., credible and uncredible; confident and unconfident, etc.) is assigned in the step of assigning, the document(s) assigned to the category of the lower degree of credibility (e.g., uncredible, unconfident) may be provided for display.

In some exemplary embodiments, the above-stated method may further comprise:

- collecting the plurality of documents to be included in the training dataset, each one of the plurality of documents having been assigned to one of the at least two classes;
- pre-processing the textual data contained in the plurality of documents;
- generating, after said pre-processing, the training dataset comprising the plurality of documents and information indicating which one of the at least two classes each one of the plurality of documents belongs to;
- training the machine learning model using the training dataset.

Further, in some exemplary embodiments, the machine learning model may be trained further using a pretrained word embedding. In the present disclosure, a "word embedding" may be understood as a method mapping words (and optionally also phrases, hereinafter, a reference to the "words" may also optionally include phrases) to vectors of real numbers. Examples of a word embedding may include, but are not limited to, Word2vec (see e.g., Mikolov et al., "Efficient Estimation of Word Representations in Vector Space", 2013, available online at: arxiv.org/abs/1301.3781) fastText (see e.g., Wikipedia, "fastText", URL: en.wikipedia.org/wiki/FastTest), GloVe (see e.g., Pennington et al., "GloVe: Global Vectors for Word Representation", 2014, available online at: nip.stanford.edu/pubs/glove.pdf; see also, nip.standford.edu/projects/glove/), Embeddings from Language Models (ELMo, see e.g., Peters et al., "Deep contextualized word representations", 2018, available online at: arxiv.org/abs/1802.05365) and Bidirectional Encoder Representations from Transformers (BERT, see e.g., Devlin, Jacob, et al. "BERT: Pre-training of deep bidirectional transformers for language understanding." arXiv preprint arXiv:1810.04805 (2018)).

Further, in some exemplary embodiments, at least a part of the ANN included in the machine learning model may form a language model trained to determine a probability of a target word occurring, given one or more words surrounding the target word. In such exemplary embodiments, the machine learning model may be trained by:

- fine-tuning the language model using textual data relating to a specified domain in which the plurality of documents included in the training dataset are comprised; and
- training the machine learning model to classify the plurality of documents comprised in the training dataset into the at least two classes.

The specified domain may include, for example, a particular topic and/or theme of documents. More specifically, for example, in case of classifying patent documents, a particular technical field may be considered as the specified domain.

In some circumstances, the language model may be pretrained with textual data that does not necessarily relate to the specified domain. For example, the textual data used for pretraining the language model may be collected from the Internet from multiple sources from which large amounts of text can be collected, such as Wikipedia, Reddit, etc. Since it may be too expensive and/or time-consuming to train a language model from scratch, one or more of pretrained language models that are publicly available (e.g., pretrained BERT-based models available online at: huggingface.co/transformers/pretrained_models.html) may be used in some exemplary embodiments.

In the exemplary embodiments where at least a part of the ANN included in the machine learning model forms the language model, for example, a transformer-based model such as BERT (see e.g., Devlin, Jacob, et al. "BERT: Pre-training of deep bidirectional transformers for language understanding." arXiv preprint arXiv:1810.04805 (2018)) may be employed as the machine learning model.

In some exemplary embodiments, the ANN included in the machine learning model may comprise:

- a recurrent neural network with an attention layer;
- a hierarchical attention network; or
- a transformer network.

An example of the "recurrent neural network with an attention layer" may be found, for example, in Bandanau et al., "Neural Machine Translation by Jointly Learning to Align and Translate", 2015, available online at: arxiv.org/abs/1409.0473v7, which describes an ANN including an RNN encoder-decoder with an attention layer (e.g. attention mechanism) provided between the encoder and the decoder.

The "hierarchical attention network" may be an ANN for classifying documents, the ANN comprising a word sequence encoder, a word-level attention layer may can calculate significance of each word in an input document, a sentence encoder and a sentence-level attention layer that may calculate significance of each sentence in the input document. Further details of the "hierarchical attention" may be found in Yang, Zichao, et al. "Hierarchical attention networks for document classification." Proceedings of the 2016 conference of the North American chapter of the association for computational linguistics: human language technologies, 2016.

The "transformer network" may be an ANN comprising an encoder-decoder structure with stacked self-attention and point-wise, fully connected layers for the encoder and the decoder. The details of the "transformer network" may be found, for example, in Vaswani, Ashish, et al. "Attention is all you need." Advances in neural information processing systems 30 (2017): 5998-6008.

Further, in some exemplary embodiments, the confidence value may be determined based on one or more of the following:

- one or more activation levels of the one or more nodes in the ANN;
- a maximum predictive probability of one of the at least two classes;
- a predictive uncertainty output by the machine learning model;
- a measure indicating whether the at least one document input to the ANN is an outlier with respect to the training dataset.

In some exemplary embodiments, in the providing for display of the one or more of the at least one document, the attention information may be provided for display so as to display the one or more parts of each document in manners different from each other based on the significance of the respective part or parts indicated by the attention information.

Further, in some exemplary embodiments, the one or more parts of each document provided for display in the classifying of said document using the machine learning model may include one or more of the following:

- one or more words in the textual data contained in said document;
- one or more sentences in the textual data contained in said document.

In some exemplary embodiments, the at least one document to be classified and the plurality of documents comprised in the training dataset may be patent documents.

In the present disclosure, the term "patent documents" may be understood as referring to documents that include patent specifications and that are published by relevant authorities (e.g., Patent Offices across the world, World Intellectual Property Organization (WIPO), etc.). Accordingly, for example, the "patent documents" in the present disclosure may include publications of patent applications and/or of granted patents.

According to another aspect, a further computer-implemented method is provided. The method may comprise:

- obtaining at least one document to be classified, the at least one document containing textual data;
- classifying, using a machine learning model, the at least one document into at least two classes, the machine learning model including an artificial neural network, ANN, and an attention mechanism and the machine learning model being trained using a training dataset comprising:
  - a plurality of documents containing textual data and
  - information indicating which one of the at least two classes each one of the plurality of documents belongs to;
- determine, for each of the at least one document, a confidence value of the classifying, based on one or more outputs of one or more nodes comprised in the ANN, the one or more outputs being obtained from the classifying of the at least one document using the machine learning model;
- assigning, to each of the at least one document, based at least in part on the confidence value, one of at least two categories that are associated with different degrees of credibility of the classifying; and
- selecting one or more of the at least one document for further processing based on the one of the at least two categories assigned to each of the at least one document.

According to yet another aspect, yet further computer-implemented method is provided. The method may comprise:

- obtaining at least one document to be classified, the at least one document containing textual data;
- classifying, using a machine learning model, the at least one document into at least two classes, the machine learning model including an artificial neural network, ANN, and an attention mechanism and the machine learning model being trained using a training dataset comprising:
  - a plurality of documents containing textual data and
  - information indicating which one of the at least two classes each one of the plurality of documents belongs to; and
- providing for display the at least one document with attention information that indicates significance of one or more parts of each of the at least one document provided for display in the classifying of said document.

According to yet another aspect, a system is provided. The system may comprise:

- at least one storage medium configured to store a machine learning model including an artificial neural network, ANN, and an attention mechanism, wherein the machine learning model is trained using a training dataset comprising:
  - a plurality of documents containing textual data; and
  - information indicating which one of at least two classes each one of the plurality of documents belongs to; and
- at least one processor in communication with the storage medium, the processor being configured to:
- obtain at least one document to be classified, the at least one document containing textual data;
- classify, using the machine learning model, the at least one document into the at least two classes;
- determine, for each of the at least one document, a confidence value of the classifying, based on one or more outputs of one or more nodes comprised in the ANN, the one or more outputs being obtained from the classifying of the at least one document using the machine learning model;
- assign, to each of the at least one document, based at least in part on the confidence value, one of at least two categories that are associated with different degrees of credibility of the classifying; and
- provide for display one or more of the at least one document with:
  - the one of the at least two categories assigned to each of the one or more of the at least one document; and
  - attention information that indicates significance of one or more parts of each document provided for display in the classifying of said document using the machine learning model.

In the system according to the above-stated aspect, the one or more of the at least one document provided for display may be assigned to a specified one of the at least two categories. The specified one of the at least two categories may be associated with the lowest degree of credibility of the classifying.

Further, in some exemplary embodiments, the at least one processor may be further configured to:

- collect the plurality of documents to be included in the training dataset, each one of the plurality of documents having been assigned to one of the at least two classes;

pre-process the textual data contained in the plurality of documents;

generate, after said pre-processing, the training dataset comprising the plurality of documents and information indicating which one of the at least two classes each one of the plurality of documents belongs to;

train the machine learning model using the training dataset.

Further, in the system according to the above-stated aspect, in the providing for display of the one or more of the at least one document, the attention information may be provided for display so as to display the one or more parts of each document in manners different from each other based on the significance of the respective part or parts indicated by the attention information.

According to yet another aspect, a non-transitory computer-readable medium. The non-transitory computer-readable medium may comprise instructions that, when executed, configure one or more hardware processors to perform a method comprising:

obtaining at least one document to be classified, the at least one document containing textual data;

classifying, using a machine learning model, the at least one document into at least two classes, the machine learning model including an artificial neural network, ANN, and an attention mechanism and the machine learning model being trained using a training dataset comprising:

a plurality of documents containing textual data; and information indicating which one of the at least two classes each one of the plurality of documents belongs to;

determining, for each of the at least one document, a confidence value of the classifying, based on one or more outputs of one or more nodes comprised in the ANN, the one or more outputs being obtained from the classifying of the at least one document using the machine learning model;

assigning, to each of the at least one document, based at least in part on the confidence value, one of at least two categories that are associated with different degrees of credibility of the classifying; and providing for display one or more of the at least one document with:

the one of the at least two categories assigned to each of the one or more of the at least one document; and attention information that indicates significance of one or more parts of each document provided for display in the classifying of said document using the machine learning model.

In the non-transitory computer-readable medium according to the above-stated aspect, the one or more of the at least one document provided for display may be assigned to a specified one of the at least two categories. The specified one of the at least two categories may be associated with the lowest degree of credibility of the classifying.

Further, in some exemplary embodiments, in the providing for display of the one or more of the at least one document, the attention information may be provided for display so as to display the one or more parts of each document in manners different from each other based on the significance of the respective part or parts indicated by the attention information.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. In some examples, the system may be a general purpose computer system. In other examples, the system may be a special purpose computer system including an embedded system.

In some circumstances, any one of the above stated aspects as well as any one of various embodiments and examples described herein may provide one or more of the following advantages:

Accountability: the various aspects and exemplary embodiments described herein may accelerates the work of the domain expert instead of attempting to automate the work. The domain expert may still be the one making the final decision, although the process of filtering large document collections can become faster.

Transparency: by presenting supportive information for interpretability, the domain expert can rapidly assess whether the machine learning model is making sense or not.

Flexibility: since the only requirement for setting up the system may be a collection of historical documents to construct the training dataset, the system can easily be applied to new domains, e.g. new technical fields or any other type of document classification of interest.

System Configuration

FIG. 1 shows a schematic diagram of an exemplary system that may include a system according to the present disclosure. The exemplary system shown in FIG. 1 may include a client device 10, a server device 20 and a document database (DB) 30, which are connected via a network 40. The network 40 may include the Internet and/or one or more intranets. Further, the network 40 may be implemented by a wired network and/or a wireless network (e.g. wireless local area network (WLAN), cellular network, etc.).

The client device 10 may be a computing device such as a personal computer. In some examples, the client device 10 may be a mobile device such as mobile phone (e.g. smartphone), a tablet computer, a laptop computer, a personal digital assistant (PDA), etc. The client device 10 may access the server device 20 via the network 40 for a user to use services (e.g., document classification and/or categorization according to the present disclosure) offered by the server device 20. The client device 10 may also access the document DB 30 via the network to retrieve one or more documents stored in the document DB 30.

The server device 20 may provide its functionality (e.g., document classification and/or categorization according to the present disclosure) to the client device 10 via the network 40. The server device 20 may be implemented by one or more computing devices. The server device 20 may comprise a processor 200 and a data storage device 202. The processor 200 may be configured to perform one or more processes relating to classification and/or categorization of documents according to various embodiments and examples as described herein. The data storage device 202 may be configured to store information necessary for the processor 200 to perform the processes according to various embodiments and examples as described herein. Further, the data storage device 202 may be configured to store information generated and/or obtained as a result of the process performed by the processor 200.

In some exemplary embodiments, the data storage device 202 may store a machine learning model 50 to classify documents into at least two classes. For example, the machine learning model 50 may include an artificial neural network (ANN) and an attention mechanism. The attention mechanism may enable the ANN to learn which part or parts of input data is or are more important than other part or parts of the input data. The attention mechanism may enhance the important part or parts of the input data and fade out the rest.

The data storage device 202 may further store a training dataset 52 for training the machine learning model 50. The training dataset 52 may comprise: a plurality of documents containing textual data; and information indicating which one of the at least two classes each one of the plurality of documents belongs to.

The details of the machine learning model 50 and the processes performed by the server device 20 will be described later below in more detail.

The document DB 30 may be a database that stores documents. The documents may contain textual data. In some exemplary embodiments, the document DB 30 may store patent documents. For example, the document DB 30 may be a publicly available patent database such as USPTO Patent Full-Text and Image Database (PatFT) and USPTO Patent Application Full-Text and Image Database (AppFT) offered by the United States Patent and Trademark Office, Espacenet offered by the European Patent Office, as well as Patentscope offered by the WIPO. In some further examples, the document DB 30 may be a non-public patent database that is available within an entity (e.g., corporation, organization, research institute, etc.) which the server device 20 belongs to.

It should be noted that, although FIG. 1 shows a single client device 10, a single server device 20 and a single document DB 30, more than one client device 10, more than one server device 20 and/or more than one document DB 30 may be connected to the network 40.

Machine-Learning Based Document Classification/Categorization

Figure 2:
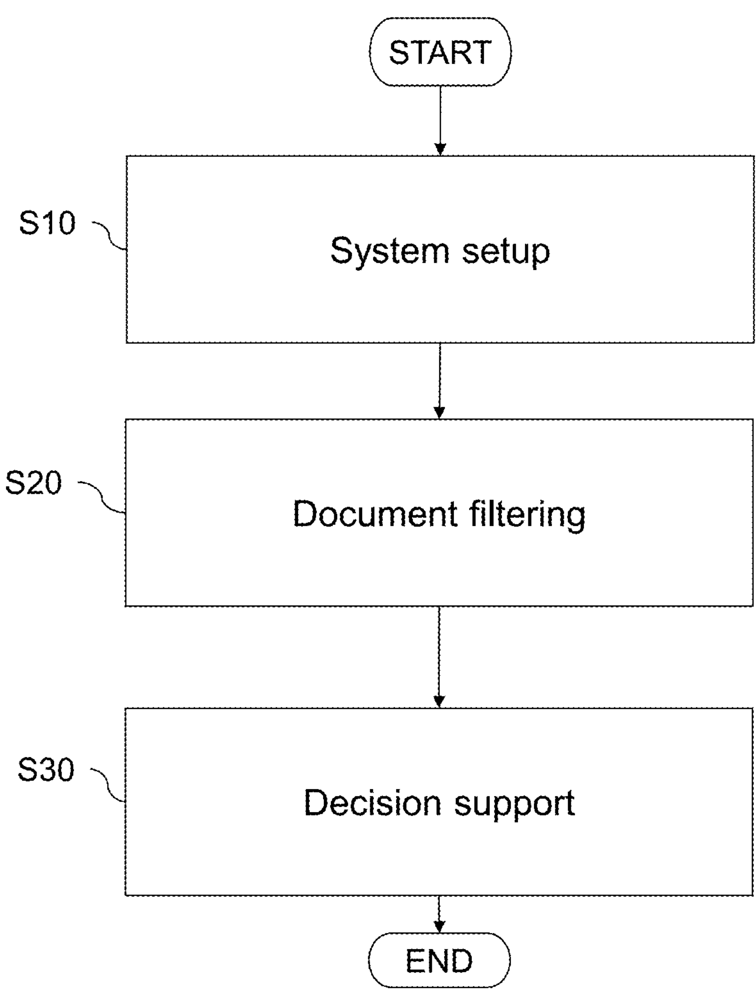
FIG. 2 shows a flow of an exemplary process performed at the system shown in FIG. 1.

FIG. 2 shows an exemplary flow of a process performed at the system shown in FIG. 1.

More specifically, for example, the server device 20 shown in FIG. 1 may perform the exemplary process shown in FIG. 2. The exemplary process shown in FIG. 2 may start when the server device 20 receives a user input instructing the start of the exemplary process, for example. The user input may be made by a user at the client device 10 and the client device 10 may send the user input to the server device 20 via the network 40.

Referring to FIG. 2, at step S10, the server device 10 may perform a system setup process including training of the machine learning model 50 to classify documents into at least two classes. As a specific example, in some exemplary embodiments, the machine learning model 50 may be trained to classify documents into two classes: a class of relevant documents and a class of irrelevant documents. The details of the system setup process at step S10 will be described later below with reference to FIGS. 3 to 5. The exemplary process shown in FIG. 2 may proceed to step S20 after step S10.

At step S20, the server device 20 may perform a document filtering process to filter documents that are classified by the machine learning model 50 based on the results of the classification. More specifically, for example, the server device 20 may determine, for each document, a confidence value of the classification of the document, based on one or more outputs of one or more nodes comprised in the ANN of the machine learning model 50 for classifying the document. The confidence value may be a numerical value representing how confident the machine learning model 50 is regarding the classification result of the document. The server device 20 may use the confidence value to select one or more documents for further processing, in other words, to filter out documents that are not subject to further processing. The details of the document filtering process performed at step S20 will be described in later below with reference to FIG. 6. The exemplary process shown in FIG. 2 may proceed to step S30 after step S20.

At step S30, the server device 20 may perform a decision support process to provide for display one or more of the documents with attention information that indicates significance of one or more parts of each document provided for display in the classification of the document. For example, the one or more of the documents provided for display may be the document(s) selected for further processing at step S20. The attention information provided for display with the document may facilitate and/or accelerate decision making for the document, e.g., whether or not the document is relevant to the user's interest. The details of the decision support process at step S30 will be described later below with reference to FIG. 7. The exemplary process shown in FIG. 2 may end after step S30.

(a) System Setup

Figure 3:
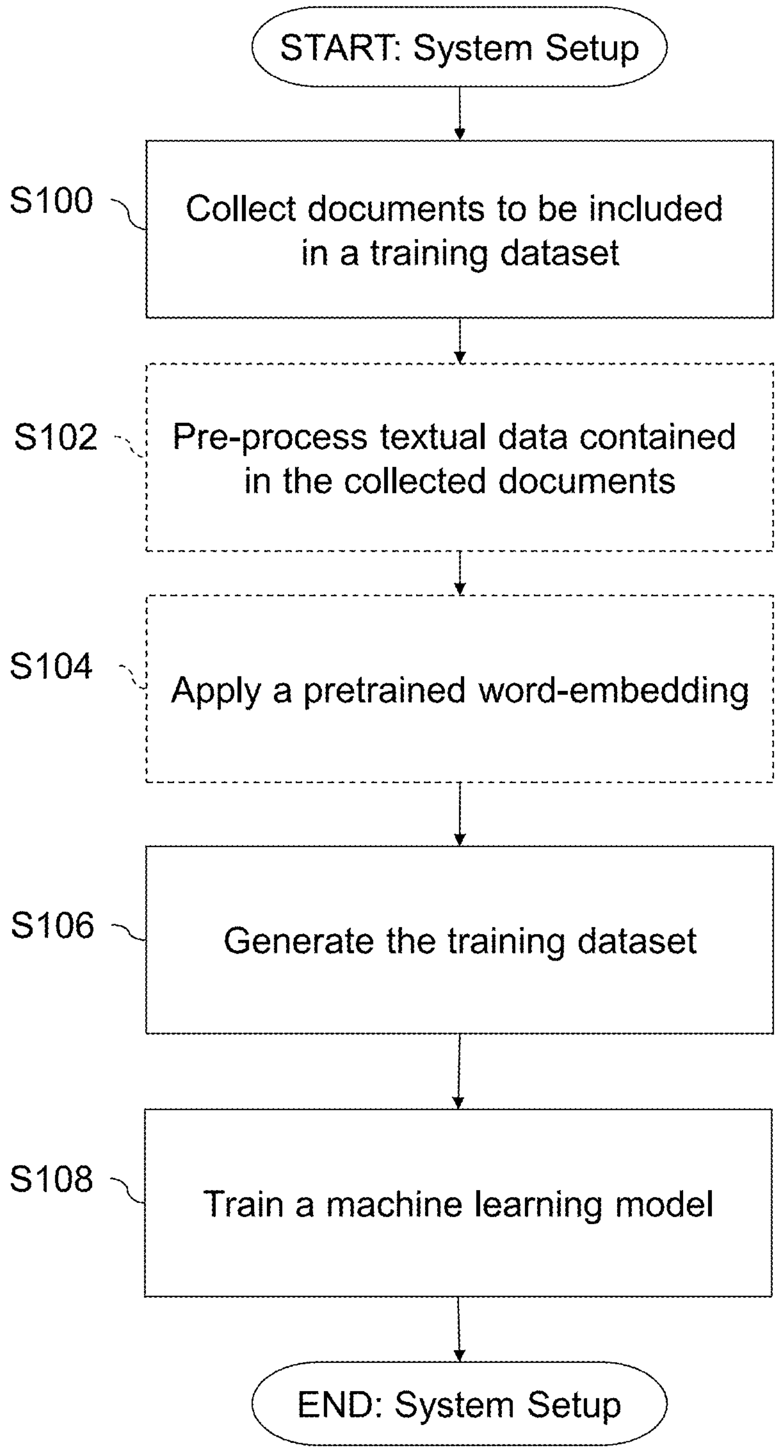
FIG. 3 shows a flow of an exemplary process to setup a system according to the present disclosure.

FIG. 3 shows a detailed flow of an exemplary system setup process performed at step S10 shown in FIG. 2. The exemplary process shown in FIG. 3 may start when the system setup process at step S10 is started.

Referring to FIG. 3, at step S100, the server device 20 may collect documents to be included in the training dataset 52 for training the machine learning model 50. The documents may be collected from the document DB 30. Each of the collected documents may have been assigned to one of the at least two classes into which the machine learning model 50 will be trained to classify documents. In the exemplary embodiments where the machine learning model 50 classifies documents into two classes of relevant documents and irrelevant documents, each of the collected documents may be annotated as either relevant or irrelevant, for example. The documents may be collected from past selections (e.g., classifications made in the past) and/or collected for the purpose of the system setup.

In the exemplary embodiments where the documents processed by the system are patent documents, each document may include, for example, the following fields: title, applicant, abstract and claims. Further, each document may be treated as a singular textual entity for input purposes. Further, each document may be indexed by its publication number. The collected patent documents may preferably belong to a single technological field.

After step S100, the exemplary process shown in FIG. 3 may proceed to step S102 which is an optional step.

At step S102, the server device 20 may pre-process textual data contained in the collected documents. For example, the server device 20 may clean the textual data to remove any non-alphanumeric tokens. This may improve the accuracy of classifications made by the machine learning model 50 since non-alphanumeric tokens may be responsible for data-leakage during the training process of the machine learning model 50, resulting in undesirable predictions. Alternatively or additionally, for example, the server device 20 may pre-process the textual data by converting all letters to lower-case since some pretrained models (e.g., for word embedding as will be stated below) are only available for lower-case text.

After step S102, the exemplary process shown in FIG. 3 may proceed to step S104 which is an optional step.

At step S104, the server device 20 may apply a pretrained word-embedding to the collected documents. A word embedding may be understood as a method mapping words to vectors of real numbers. A pretrained word-embedding may include resulting vectors of real numbers corresponding to the words, obtained by performing the mapping method. The use of the pretrained word embedding may improve the performance of the ANN included in the machine learning model 50 to classify documents.

Some word embeddings may use one-hot encoding for constructing vectors of real numbers corresponding to words. One-hot encoding is a common form of encoding language into a vector of numbers that can be fed to an NLP algorithm. To one-hot encode a word, also referred to as a token, a vocabulary of significantly often occurring tokens may be created from available textual data. A vocabulary vector may contain an index for every token that is deemed to occur often enough to be considered. To one-hot a word may indicate setting the index at the vector position representing that word to "1" and all other positions for all other possible words to "0". In other words, a one-hot vector corresponding to a particular word may be a vector having a dimension of a vocabulary size, where only one element corresponding to the particular word has a value "1" and all other elements have a value "0".

As the working vocabulary within a domain grows larger, so too does the size of the one-hot vectors, which are sparse having only one flipped bit or "1" in the vector. This sparseness often leads to negative side-effects when working with machine learning and deep learning algorithms, known as the "curse of dimensionality". As such, methods of embedding words into continuous vectors were developed that allowed for the encoding of words into continuous vectors of floating-point values that significantly reduce the size of the representations and make the word vectors denser. Such a representation may be easier and more salient for machine learning algorithms to work with.

An example of a word embedding method is Word2vec that uses an ANN trained to reconstruct linguistic context of words (see e.g., Mikolov et al., "Efficient Estimation of Word Representations in Vector Space", 2013, available online at: arxiv.org/abs/1301.3781). The ANN used in Word2vec may be trained either with the Continuous Bag-of-words (CBOW) or the Skip-gram method. In both CBOW and Skip-gram methods, a neural network including an intermediate, hidden layer (which may also be referred to as an "embedding layer"), $h_i$ ($i=1, 2, \ldots, N$), of a size N (which may be considered as the continuous embedding size) may be trained with standard neural backpropagation using a number C of context words and training weights W.

Figure 4:
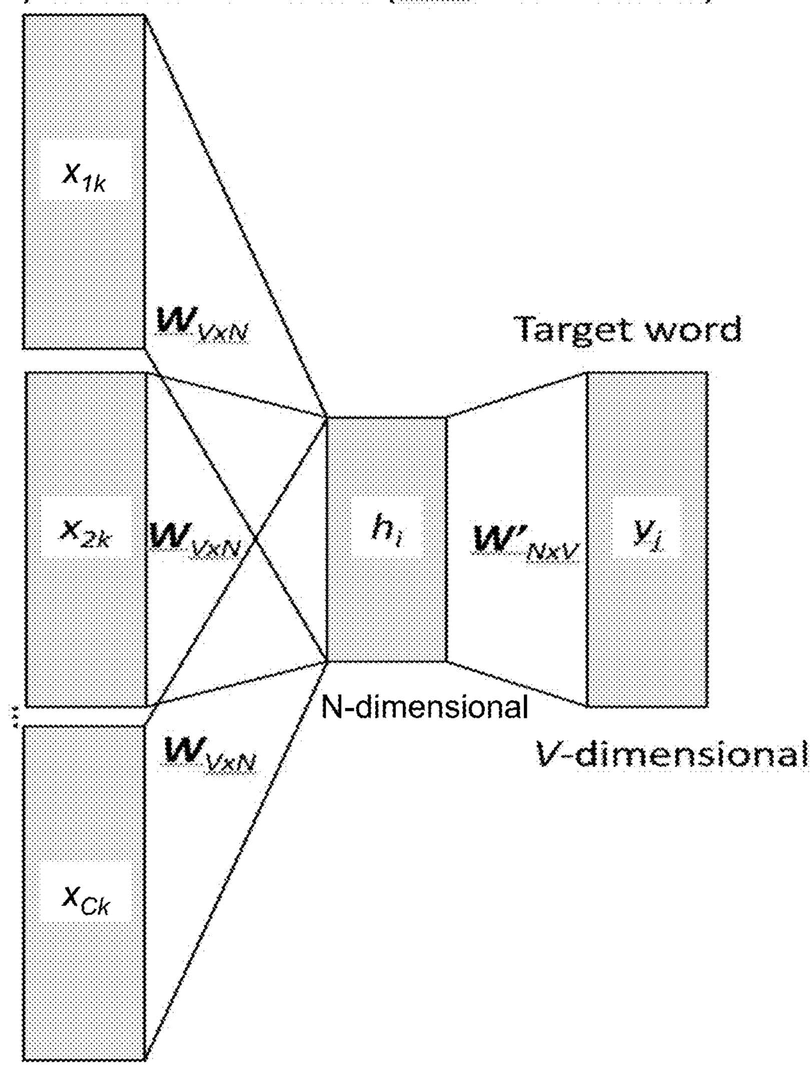
FIG. 4 shows a schematic diagram of an exemplary ANN used in a Continuous Bag of Words (CBOW) method.

FIG. 4 shows a schematic diagram of an exemplary ANN used in the CBOW method of Word2vec. In the CBOW method, the ANN may be trained to predict a target word, $y_j$ ($j=1, 2, \ldots, V$), given context words $X_{1k}, X_{2k}, \ldots, X_{Ck}$ ($k=1, 2, \ldots, V$) surrounding the target word $y_j$, as an input to the ANN. Each of the target word $y_j$ and the context words $X_{1k}, X_{2k}, \ldots, X_{Ck}$ may be a one-hot vector that has a dimension V (e.g., vocabulary size) and that represents the corresponding word. For a specific example, with regards to a sentence, "I love medicine", in case of creating an embedding for the word "love" with the CBOW method, the one-hot vectors for the words "I" and "medicine" may be taken as the input (e.g., context words $X_{1k}, \ldots, X_{Ck}$) to the ANN to predict the one-hot vector for the target word "love" (e.g., the target word $y_j$).

Figure 5:
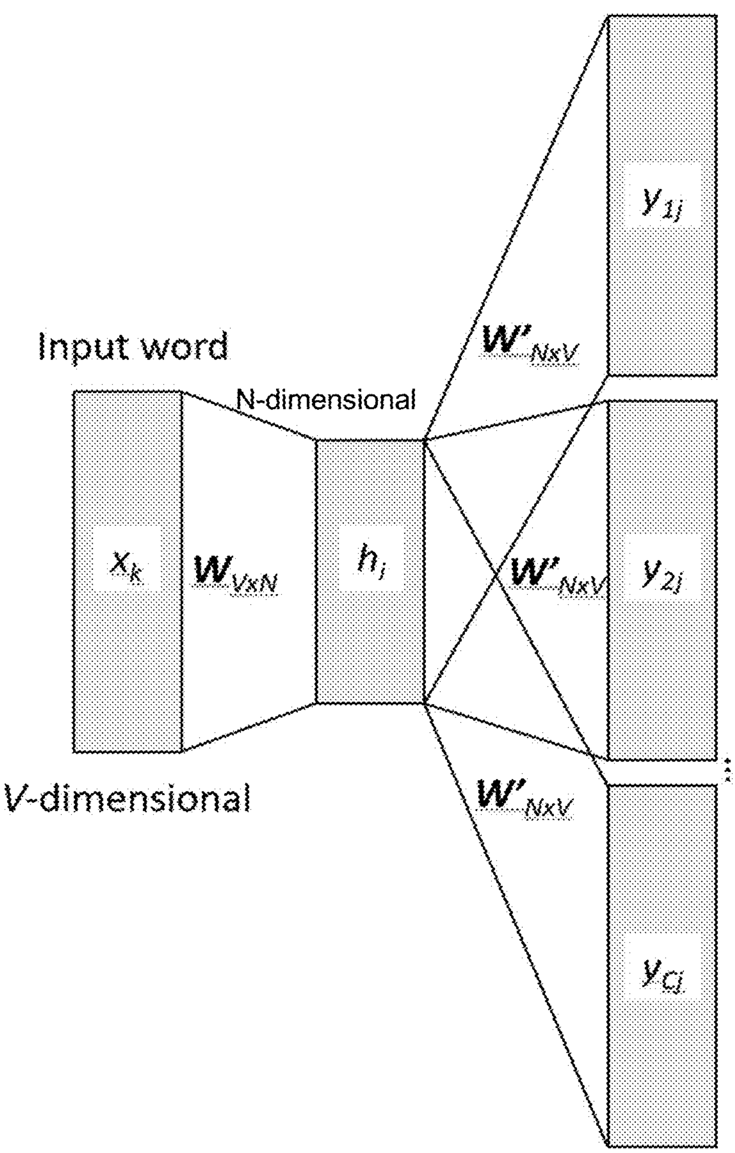
FIG. 5 shows a schematic diagram of an exemplary ANN used in a Skip-gram method.

FIG. 5 shows a schematic diagram of an exemplary ANN used in the Skip-gram method of Word2vec. In the Skip-gram method, the ANN may be trained to predict context words $y_{1j}, y_{2j}, \ldots, y_{Cj}$ ($j=1, 2, \ldots, V$) for an input word $x_k$ ($k=1, 2, \ldots, V$), given the input word as the input to the ANN. Similarly to the CBOW method, each of the context words $y_{1j}, y_{2j}, \ldots, y_{Cj}$ and the target word $x_k$ may be a one-hot vector that has a dimension V (e.g., vocabulary size) and that represents the corresponding word. For a specific example, with regards to a sentence, "I love medicine", in case of creating an embedding for the word "love" with the Skip-gram method, the one-hot vector of the input word "love" (e.g., the input word $x_k$) may be taken as the input to the ANN to predict the one-hot vectors of the context words "I" and "medicine" (e.g., context words $y_{1j}, \ldots, y_{Cj}$).

In both the CBOW and Skip-gram methods, the activations (e.g., output values) of the hidden layer ($h_i$) functions may be considered as the word embedding (e.g., a vector including floating-point values) representing the target or input word (e.g., "love" in the specific example), since the hidden layer may be understood as encoding the relevant features of a word via the CBOW or Skip-gram training process.

Further examples of a word embedding may include, but are not limited to, fastText, GloVe, ELMo and BERT.

Referring again to FIG. 3, one of the exemplary word embedding methods may be selected to be applied at step S104 and the pretrained word vectors according to the selected word embedding method may be applied to the collected documents. Large pre-trained models that are publicly available (e.g., pretrained word and phrase vectors according to Word2vec available online at: code.google-.com/archive/p/word2vec/; pretrained word vectors according to GloVe available online at: nip.standford.edu/projects/glove/) often have embedding vectors with a large number C of context words and are trained on many sentences obtained off the internet from sites such as Wikipedia, Twitter or Common Crawl. This Big-data approach to embedding creation may lead to very general embeddings that function for general purpose word representations. Such embeddings are not explicitly trained on a specific field of textual data (e.g., patent documents) but are rather pre-trained on vast swathes of textual data found on the internet and are used to provide word embeddings that are well representative of their usage in general language. These word embeddings may then be fed as rich input to a model for a specific task, such as classification of documents of a specific kind and/or field (e.g., patent documents).

In some exemplary embodiments, the pretrained word vectors trained according to a selected word embedding method with general text as stated above may be further trained or fine-tuned on textual data in a specific kind and/or field (e.g., of patents) so as to obtain word vectors that are directed to the specific kind and/or field of textual data.

After step S104, the exemplary process shown in FIG. 3 may proceed to step S106.

At step S106, the server device 20 may generate the training dataset 52 using the documents collected at step S100. In case one or both of the steps S102 and S104 is or are performed, the results of the steps S102 and/or S104 are also used for generating the training dataset 52. The training dataset 52 generated at step S106 may include the collected documents and information indicating which one of the at least two classes (e.g., relevant and irrelevant in case of two classes) each collected document belongs to. After step S106, the exemplary process shown in FIG. 3 may proceed to step S108.

At step S108, the server device 20 may train the machine learning model 50 using the training dataset 52. As also stated above, the machine learning model 50 may include an ANN and an attention mechanism. The attention mechanism may be a technique that mimics cognitive attention in an ANN. For example, with the attention mechanism, the ANN may learn which part or parts of input data is or are more important than other part or parts of the input data. In other words, the attention mechanism may be used to reward the ANN for learning which part(s) of an input is (are) significant. The byproduct may be a vector that essentially assigns weights to different parts of the input, the weights signifying the importance of corresponding parts of the input. The ANN included in the machine learning model may comprise a recurrent neural network with an attention layer, a hierarchical attention network or a transformer network, for example.

For a specific example, in some exemplary embodiments, the machine learning model 50 may comprise the hierarchical attention network that can provide word-level attention (e.g., representing significance of each word) and sentence-level attention (e.g., representing significance of each sentence), as described in Yang, Zichao, et al. "Hierarchical attention networks for document classification." Proceedings of the 2016 conference of the North American chapter of the association for computational linguistics: human language technologies, 2016. For example, in the hierarchical attention network, the word-level attention may be calculated as follows:

$$u_{it} = \tanh(W_w h_{it} + b_w),$$

$$a_{it} = \frac{\exp(u_{it}^T u_w)}{\sum_t \exp(u_{it}^T u_w)},$$

$$s_i = \sum_t a_{it} h_{it}$$

where an attention $a_{it}$ for a t-th word in an i-th sentence (t=1, 2, . . . , T; i=1, 2, . . . , L) of an input document may be a normalized similarity between a hidden representation $u_{it}$ of the t-th word in the i-th sentence of the input document and a global learned word context vector $u_w$ that may be learned during the training process. The hidden representation $u_{it}$ may be obtained through feeding the word representation $h_{it}$ (e.g., the word embedding for the t-th word in the i-th sentence) through a trainable hidden layer with weights $W_w$ and a bias vector $b_w$. Sentence attention $s_i$ for the i-th sentence of the input document, may then be functionally the weighted sum of the word representations $h_{it}$ multiplied by the attentions $a_{it}$.

Likewise, the sentence-level attention in the hierarchical attention network can be calculated as follows by evaluating how much a sentence contributes to the final decision of document classification:

$$u_i = \tanh(W_s h_i + b_s),$$

$$a_i = \frac{\exp(u_i^T u_s)}{\sum_i \exp(u_i^T u_s)},$$

$$v = \sum_i a_i h_i$$

where a sentence vector $h_i$ for the i-th sentence in the input document may be generated as a by-product of the neural word-level classification process. This procedure may then follow a procedure analogous to that of the word-level attention stated above, creating a hidden sentence representation $u_i$, a trainable sentence attention vector $a_i$, and a weighted sum attention vector v. More specifically, for example, the hidden layer sentence representation $u_i$ of the i-th sentence may be obtained through feeding the sentence representation $h_i$ through a trainable hidden layer with weights $W_s$ and a bias vector $b_s$. The attention vector v may be the weighted sum of the sentence representations $h_i$ multiplied by the attention vectors $a_i$.

The attention vectors at sentence and word levels as stated above may be projected onto the document in the decision support process that will be described later below. Further, the attention vectors may be used to help users identify what words are relevant to the model, as it may be identified what words and/or sentences "weigh" more than others.

By training the machine learning model 50 with an ANN and an attention mechanism as stated above at step S108 shown in FIG. 3, the machine learning model 50 may learn to pay more "attention" to particular words and/or sentences.

The exemplary process shown in FIG. 3 may end after step S108.

Referring again to FIG. 2, the system setup process step S10 may be completed by performing the exemplary process shown in FIG. 3. After step S10, the exemplary process shown in FIG. 2 may proceed to step S20 to perform a document filtering process.

(b) Document Filtering

Figure 6:
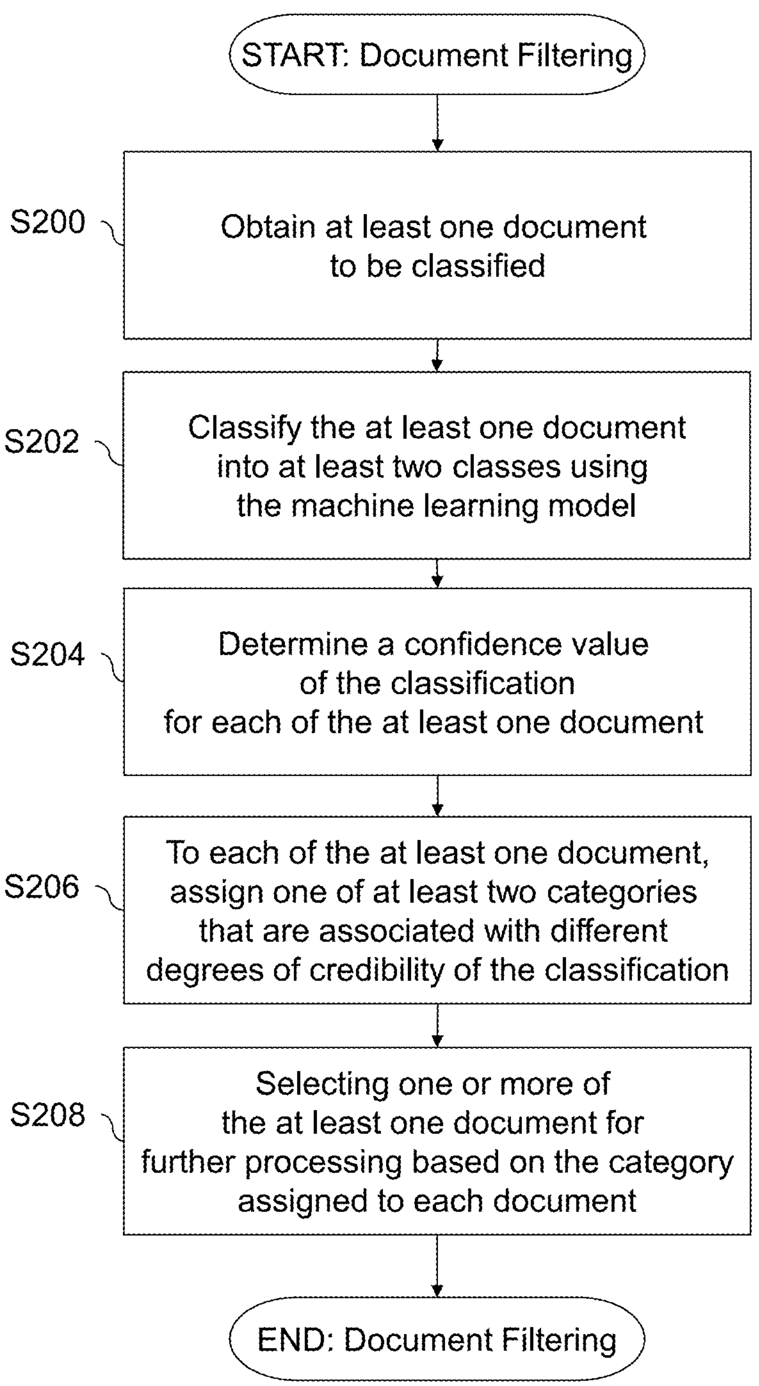
FIG. 6 shows a flow of an exemplary process to filter documents according to the present disclosure.

FIG. 6 shows a detailed flow of an exemplary document filtering process performed at step S20 shown in FIG. 2. The exemplary process shown in FIG. 6 may start when the document filtering process at step S20 is started.

At step S200, the server device 20 may obtain at least one document to be classified. For example, the server device 20 may receive, from the client device 10 via the network 40, an input that is made by the user and that specifies the at least one document to be classified. The at least one document (e.g., the document(s) specified by the user with the input) may be obtained from the document DB 30. For instance, in the exemplary embodiments where patent documents are classified, the at least one document may be obtained by retrieving, from the document DB 30, patent documents that meet a specified set of conditions (e.g., publication date being within a specified time period, assigned to a specified IPC (International Patent Classification) class, including one or more specified keywords, etc.) using, e.g., a query-function provided by the document DB 30. In some circumstances, the specified set of conditions may be included in the user input received by the server device 20 from the client device 10. In the exemplary embodiments where patent documents are classified, the at least one document to be classified preferably belongs to the same IP domain as the documents included in the training dataset 52. After step S200, the exemplary process shown in FIG. 6 may proceed to step S202.

At step S202, the server device 20 may classify the at least one document into at least two classes using the machine learning model 50. The machine learning model 50 may have been trained in the system setup process as described above with reference to FIGS. 3 to 5. In some exemplary embodiments, the machine learning model 50 may classify the at least one document into two classes: a class of relevant documents and a class of irrelevant documents. After step S202, the exemplary process shown in FIG. 6 may proceed to step S204.

At step S204, the server device 20 may determine a confidence value of the classification for each of the at least one document. The confidence value may be a numerical value representing how confident the machine learning model 50 is regarding a classification result for each document output by the machine learning model 50. In other words, the confidence value may represent how credible the classification result of the machine learning model 50 for each document can be.

In some exemplary embodiments, the confidence value for the classification result of each document may be based on one or more of the following:

(i) one or more activation levels of the one or more nodes in the ANN included in the machine learning model 50;

(ii) a maximum predictive probability of one of the at least two classes (e.g., in case the machine learning model 50 outputs a predictive probability of the input document belonging to each of the at least two classes, the maximum predictive probability among the predictive probabilities of the at least two classes);

(iii) a predictive uncertainty output by the machine learning model 50 (e.g., in case the machine learning model 50 predicts probability distributions rather than point predictions, the predictive uncertainty may be given by the width of prediction (see e.g., an ANN using Monte Carlo-dropout as described in Gal, Yarin, and Zoubin Ghahramani. "Dropout as a bayesian approximation: Representing model uncertainty in deep learning." international conference on machine learning, 2016));

(iv) a measure indicating whether the at least one document input to the ANN is an outlier with respect to the training dataset (e.g., as described in US 2020/0074269 A1).

Regarding the above-stated item (i) one or more activation levels of the one or more nodes in the ANN included in the machine learning model 50, the "one or more nodes in the ANN" may be the node(s) included in a final layer of the ANN, where each node may correspond to a particular class. In case of classifying documents into two classes (e.g., relevant and irrelevant), two nodes corresponding to the two classes may be included in the final layer of the ANN. The numerical values outputted by the two nodes may be considered as the activation levels of the nodes in this case. A softmax function is usually applied to the final layer of the ANN, ensuring that all the output values of the nodes together sum up to one (e.g., 100%), which may roughly correlate with the predictive probability, in other words, what is the chance (e.g., in percentage) this prediction is correct.

Further, concerning the above-stated item (ii) a maximum predictive probability of one of the at least two classes, the predictive probability may be calibrated to better reflect the true probabilities, for instance, by using so called temperature scaling (see e.g., Guo, Chuan, et al. "On calibration of modern neural networks." Proceedings of the 34th International Conference on Machine Learning, PMLR, 2017).

After step S204, the exemplary process shown in FIG. 6 may proceed to step S206.

At step S206, the server device 20 may assign, to each of the at least one document, based at least in part on the confidence value, one of at least two categories that are associated with different degrees of credibility of the classification performed by the machine learning model 50. For example, one or more threshold values for the confidence value may be specified and the server device 20 may compare the one or more threshold values with the confidence value for assigning a category to each document. For a specific example, in case of assigning one of two categories (e.g., credible and uncredible; confident and unconfident, etc.), a document may be assigned a category with a higher degree of credibility if the confidence value for the classification result of that document exceeds a specified threshold value. On the other hand, the document may be assigned a category with a lower degree of credibility if the confidence value for the classification result of that document is equal to or lower than the specified threshold value.

After step S206, the exemplary process shown in FIG. 6 may proceed to step S208.

At step S208, the server device 20 may select one or more of the at least one document for further processing based on the category assigned to each document. For example, the server device 20 may select one or more of the at least one document that is or are assigned to a specified one of the at least two categories. In some exemplary embodiments, the specified one of the at least two categories may be associated with the lowest degree of credibility of the classification. The specified one of the at least two categories may be notified to the server device 20 from the client device 10 via the network 40 according to a user input made at the client device 10, for example.

The selection made at step S208 may also be considered as a process step of filtering out the non-selected document(s), thereby reducing the number of documents to be processed further.

The documents selected at step S208 may be subject to a decision support process as will be described below with reference to FIGS. 2 and 7, for example.

After step S208, the exemplary process shown in FIG. 6 may end.

Referring again to FIG. 2, the document filtering process step S20 may be completed by performing the exemplary process shown in FIG. 6. After step S20, the exemplary process shown in FIG. 2 may proceed to step S30 to perform a decision support process.

(c) Decision Support

Figure 7:
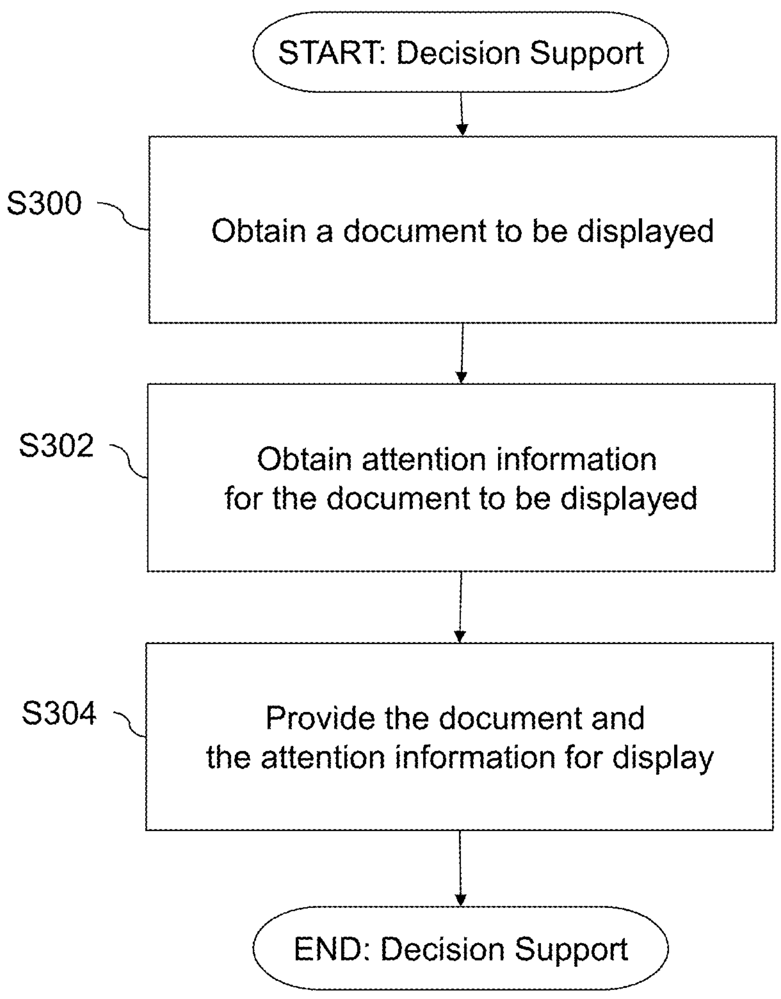
FIG. 7 shows an exemplary flow of a process to support decision making regarding a document according to the present disclosure.

FIG. 7 shows a detailed flow of an exemplary decision support process performed at step S30 shown in FIG. 2. The exemplary process shown in FIG. 7 may start when the document filtering process at step S30 is started.

At step S300, the server device 20 may obtain a document to be displayed. The document to be displayed may be one of the selected documents at step S208 shown in FIG. 6. In some exemplary embodiments, the document to be displayed may be specified by a user input made at the client device 10. Such an user input may be sent to the server device 20 from the client device 10 via the network 40.

At step S302, the server device 20 may obtain attention information for the document to be displayed. As also stated above, the attention information may indicate significance of one or more parts of the document in the classification performed by the machine learning model 50. In some exemplary embodiments, the attention information for the document to be displayed may be obtained by classifying the document to be displayed using the machine learning model 50. In other words, the server device 20 may input the document to be displayed to the machine learning model 50 (used for classification of at least one document at step S202 shown in FIG. 6) for classification. Since the machine learning model 50 includes an attention mechanism as described above, performing classification using the machine learning model 50 may provide not only a classification result (e.g., indicating which class the document belongs to or is likely to belong to) but also the attention information indicating which part or parts of the document is or are more significant than other parts of the document for the classification. For a specific example, in case the machine learning model 50 comprises a hierarchical attention network as mentioned above, word level and sentence level attention vectors may be obtained as the attention information from the machine learning model 50 when performing the classification of the document.

In further exemplary embodiments, at step S302, the server device 20 may refer to results of classification performed for the document to be displayed using the machine learning model 50 at step S202 shown in FIG. 6 in order to obtain the attention information for the document to be displayed. In such exemplary embodiments, the classification result and the attention information may be stored in the data storage device 202 when performing the classification at step S202 shown in FIG. 6 using the machine learning model 50. Thus, in such exemplary embodiments, the server device 20 may merely retrieve, from the data storage device 202, the attention information for the document to be displayed and does not need to perform the classification at step S302.

After step S302, the exemplary process shown in FIG. 7 may proceed to step S304.

At step S304, the server device 20 may provide for display the document obtained at step S300 and the attention information obtained at step S302. For example, the server device 20 may provide the document and the attention information for display at a display device of the client device 10. In some exemplary embodiments, the server device 20 may further provide for display the classification result of the document (e.g., relevant or irrelevant; see also, step S202 of FIG. 6) and/or the category assigned to the document (e.g., classification with low credibility; see also, step S206 of FIG. 6).

In some exemplary embodiments, at step S304, the attention information may be provided for display so as to display the one or more parts of the document in manners different from each other based on the significance of the respective part or parts indicated by the attention information. For example, the parts (e.g., words and/or sentences) of the document with higher significance (e.g., greater attention activation levels) may be highlighted with a higher intensity. Additionally or alternatively, numerical values may be displayed in association with the one or more parts of the document for which the significance is indicated in the attention information, where higher numerical values are displayed for the part(s) with higher significance. Further, additionally or alternatively, font sizes of texts for the parts with higher significance may be made larger than the font sizes of texts for other parts.

The display of the document and the attention information at step S304 may facilitate the decision on whether the document indeed belongs to the class identified by the machine learning model 50 (e.g., whether the document indeed is relevant for the interest of the user).

After step S304, the exemplary process shown FIG. 7 may end.

Referring again to FIG. 2, the decision support process step S30 may be completed by performing the exemplary process shown in FIG. 7.

Exemplary Use Case

Figure 8:
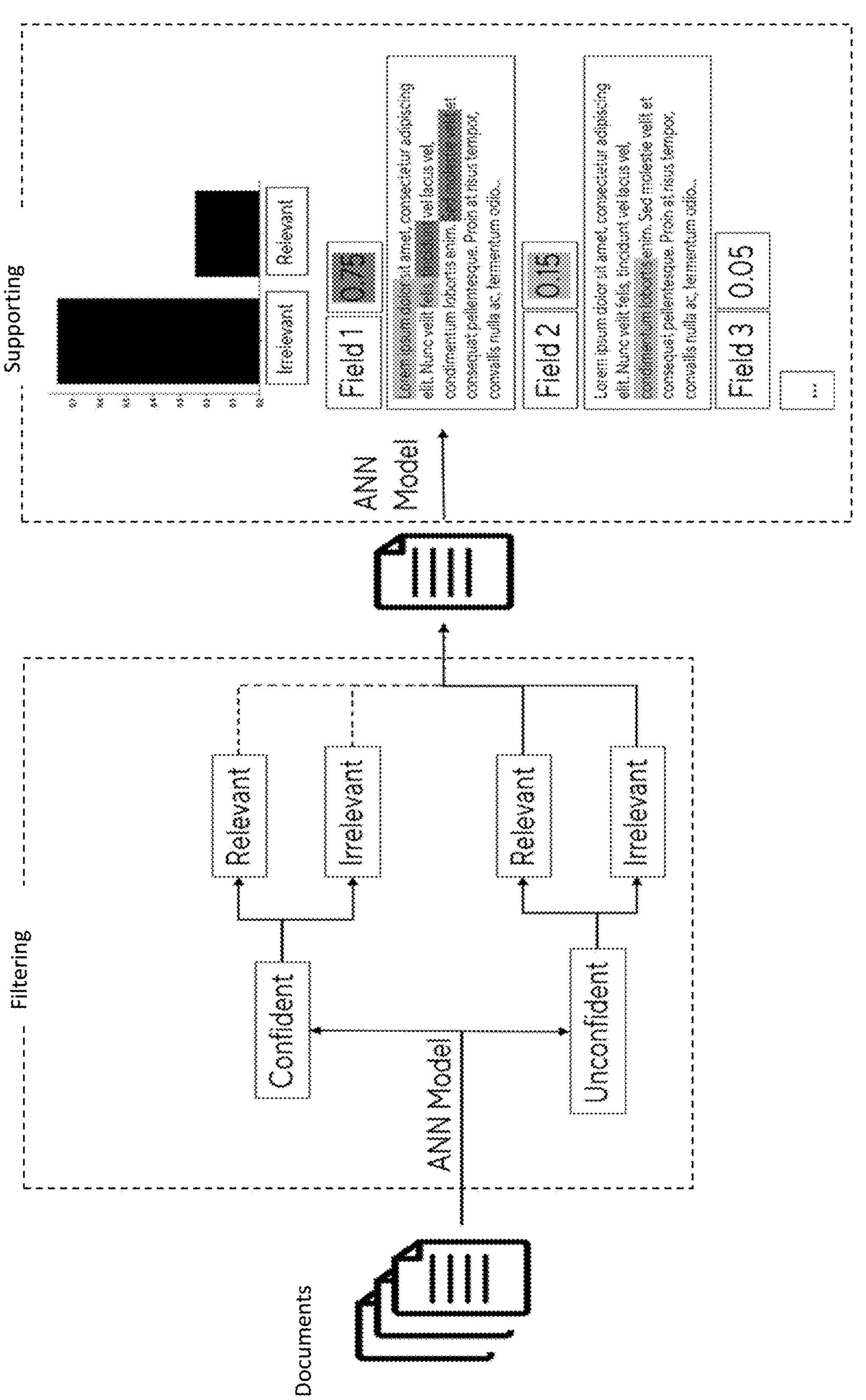
FIG. 8 shows a schematic diagram of an exemplary workflow of processing documents according to the present disclosure.

FIG. 8 shows a schematic diagram of an exemplary workflow of processing documents according to the present disclosure, specifically, in an exemplary use case of processing patent documents.

In the specific example shown in FIG. 8, an ANN model (an example of the machine learning model 50) classifies documents into two classes: a class of relevant documents and a class of irrelevant documents. Further, in this specific example, each of the documents classified by the ANN model is assigned to a "confident" category or a "unconfident" category, based on a confidence value representing how confident the ANN model is regarding its classification result for the document (cf. e.g. step S204 and S206 of FIG. 6). In the "filtering" phase shown in FIG. 8 (corresponding to the exemplary document filtering process shown in FIG. 6), documents assigned to the "unconfident" category are passed on to the "supporting" phase (corresponding to the exemplary decision support process shown in FIG. 7). Each field in the "supporting" phase shown in FIG. 8 is one of specified fields of patent documents, such as title, applicant, abstract, claims, etc. The broken lines extending from the "relevant" and "irrelevant" classes of the "confident" category indicate that the patent documents in the "confident" category may also be fed to the "supporting" phase in case the user so wishes.

According to the exemplary use case of the present disclosure, a method of patent document analysis may be provided, which can increase the speed of patent document analysis and reduce cognitive load placed on the reader during the analysis process. This may be achieved by filtering out patent documents that are obviously relevant or irrelevant (e.g., filtering out the patent documents for which the ANN model is confident of the relevance/irrelevance) and by front-loading information gained from patent documents previously deemed as relevant by company patent experts in order to reach a decision on a patent document faster than manual analysis. Furthermore, the insight granted into patent classification can act as an additional method of insight into the patent domain itself, as the user can learn from the information highlighted by the system and use that as grounds for decision-making for future patents even without the support system.

Variations

It should be appreciated by those skilled in the art that the exemplary embodiments and their variations as described above with reference to FIGS. 1 to 8 are merely exemplary and other embodiments and variations may exist.

For example, although the exemplary embodiments and their variations as described above include the document filtering process (cf. step S20 of FIG. 2; FIG. 6) and the decision support process (cf. step S30 of FIG. 2; FIG. 7), in further exemplary embodiments, the document filtering process and the decision support process may be performed independently of each other. For instance, in some circumstances, only the system setup process step S10 and the document filtering step S20 of FIG. 2 may be performed without performing the decision support step S30. In some further circumstances, the document filtering process step S20 of FIG. 2 may be skipped and the decision support process step S30 may be performed after the system setup step S10. When skipping the document filtering process step S20, the server device 20 may perform classification of the document to be displayed using the machine learning model 50 in order to obtain the attention information (cf. step S302 of FIG. 7).

Further, for example, in the exemplary decision support process described above with reference to FIGS. 2 and 7, the attention information for the document to be displayed may be obtained by classifying the document using the machine learning model 50 that is used also in the exemplary document filtering process. In further exemplary embodiments, however, the attention information for the document to be displayed in the decision support process may be obtained by classifying the document using a further machine learning model that is different from the machine learning model 50 used in the document filtering process. In such exemplary embodiments, the further machine learning model may include an ANN and an attention mechanism that are different from those included in the machine learning model 50.

Further, for example, although the exemplary decision support process described above with reference to FIGS. 2 and 7 refer to displaying a single document at a time, in some further exemplary embodiments, more than one document may be provided for display in a manner analogous to that described with reference to FIGS. 2 and 7.

Further, for example, although the hierarchical attention network is described as a specific example of the attention mechanism to obtain attention information, in further exemplary embodiments, other methods may be employed for obtaining attention information. For instance, post-hoc explanation methods such as LIME (Local Interpretable Model-agnostic Explanations; see e.g., Ribeiro, Marco Tulio, Sameer Singh, and Carlos Guestrin. ""Why should I trust you?" Explaining the predictions of any classifier." Proceedings of the 22nd ACM SIGKDD international conference on knowledge discovery and data mining, 2016) or SHAP (SHapley Additive exPlanations; see e.g., Lundberg, Scott M., and Su-In Lee. "A unified approach to interpreting model predictions." Advances in neural information processing systems. 2017) may be employed. Alternatively, a transformer network such as BERT may be employed.

In case a transformer-based model such as BERT is employed as the machine learning model 50, at least a part of the ANN included in the machine learning model 50 may be considered as forming a language model trained to determine a probability of a target word occurring, given one or more words surrounding the target word. In this case, the system setup process (see e.g. FIG. 3) may be considered as relating to the following three steps: language model training, language model fine-tuning and classification task training. A task of the language model training may be to learn the probability of the target word occurring, given one or more words surrounding the target word. Learning this task may encode vital information within the model about the syntactic and semantic properties of language. It is noted that the language model training does not require annotated textual data (e.g., annotations indicating which classes documents belong to). Training a language model from scratch usually involves training a language model on a very large amount of textual data from the Internet, from multiple sources, where large amounts of text can be collected, such as Wikipedia and Reddit. Generally speaking, it is uncommon to train a language model from scratch, as it is very expensive and time-consuming. Therefore, one or more of pre-trained language models that are publicly available, e.g., pretrained BERT-based models (available online at: huggingface.co/transformers/pretrained_models.html), may be used in case the machine learning model 50 includes a language model.

Once a generic language model (e.g., a generic BERT model) has been created, the language model can be further fine-tuned on a specific domain by continuing training the generic language model on domain specific data. For example, when classifying patent documents, an entity using the system may have access to many patent documents without annotations for the classification. While the patent documents without annotations cannot directly be used in the classification step, they may be used to further fine-tune the language model on syntactic and semantic properties specific to the patent domain. The fine-tuning of the language model may be performed, for example, in addition to or in place of step S104 of FIG. 3.

Finally, when a suitable fine-tuned language model has been created, the classification task training may begin (e.g., at step S108 of FIG. 3). In the classification task training, the machine learning model 50 may be trained to learn to identify some input text into the at least two classes (e.g., either relevant or irrelevant, in case of performing a binary classification). The output of the language model may be considered as a highly salient representation of the text given as input to the machine learning model 50. This representation may then be used to train a hidden layer to predict which class the input text belongs to. Once this classification task training is complete, the machine learning model may be ready to be used on unseen documents.

Further, in some exemplary embodiments, in case a user indicates (e.g., in response to the display of a document at step S304 of FIG. 7) that a document has been incorrectly classified by the system, the user may input a correct class for the document using the client device 10. The server device 20 may receive the user input including the correct class for the document and update the training dataset 52 by including the document with the correct class specified in the user input. The server device 20 may retrain the machine learning model 50 using the updated training dataset 52. Such retraining of the machine learning model 50 may be performed, for example, in specified time intervals and/or when a specified number of documents with classes indicated in the user inputs (in other words, new documents with manually entered classes) have been added to the training dataset 52. The retraining of the machine learning model 50 with the updated training dataset 52 may iteratively provide more nuanced understanding of the document domain (e.g., a specific technical field of patent documents) as the system progressively receives more data.

Active learning may also be used in the system setup process (cf. step S10 of FIG. 2; FIG. 3) in situations where there is no historical decision available. This might be the case, for example, when setting up the system for classifying documents related to a new domain (e.g., patent monitoring for a new technical field). In such situations, a random subset may be selected from available, unlabeled, documents to be manually classified. The manual classification may then be used for training the machine learning model 50 to setup the first underlying model of the system.

Hardware Configuration

Figure 9:
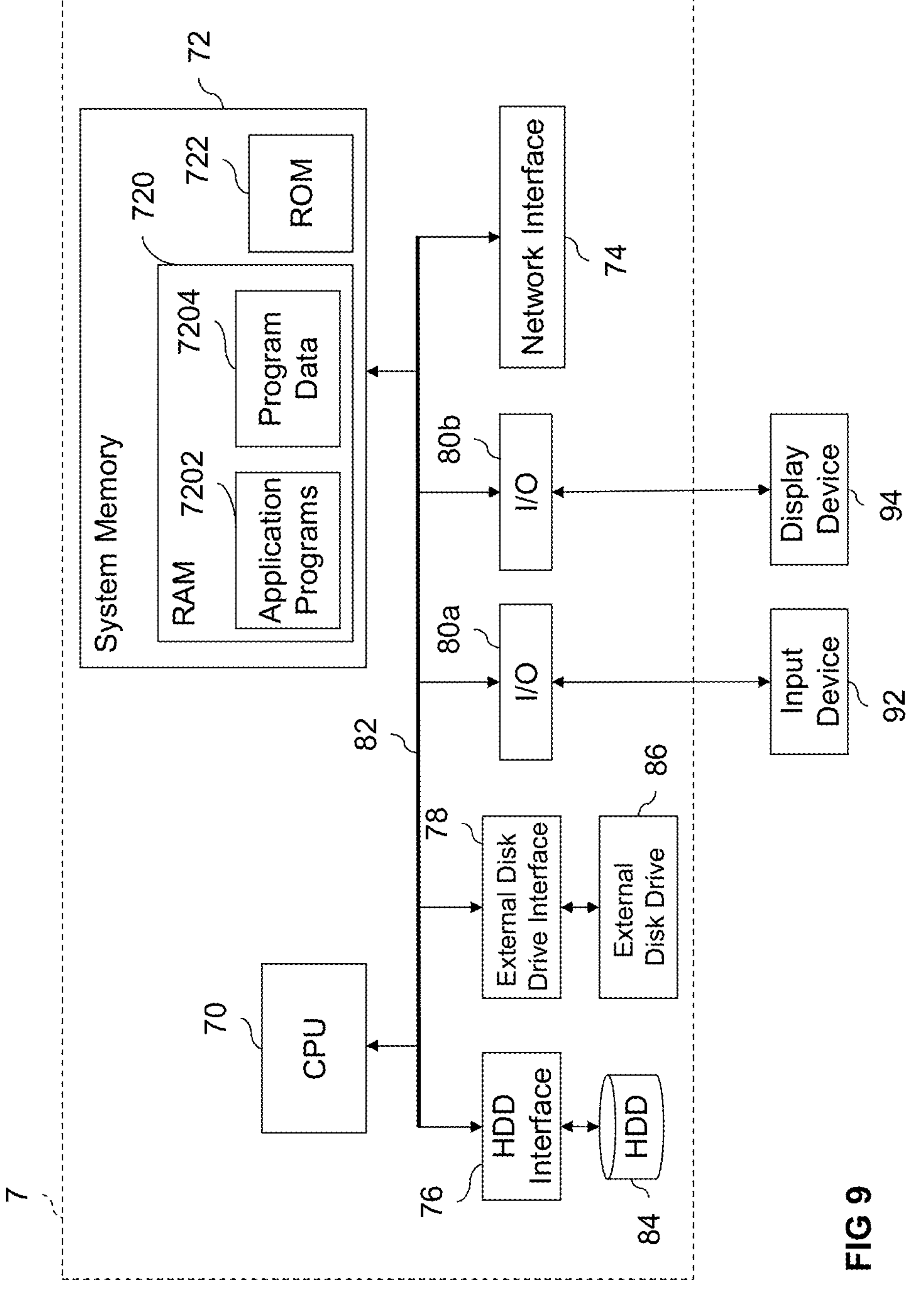
FIG. 9 shows an exemplary hardware configuration of a computer that may be used to implement at least a part of the system described herein.

FIG. 9 shows an exemplary hardware configuration of a computer that may be used to implement at least a part of the system as described above. For example, the client device 10 and/or the server device 20 shown in FIG. 1 may be implemented with the computer 7 shown in FIG. 9. The computer 7 shown in FIG. 9 includes a central processing unit (CPU) 70, a graphics processing unit (GPU) 88, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the exemplary method and its variations as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as a mouse and/or keyboard and a display device 94 such as a liquid crystal display, via corresponding I/O interfaces 80*a* and 80*b* as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 9, the computer 7 may further be connected to a printer and/or an imaging device such as a camera, via corresponding I/O interfaces and the system bus 82.

In addition or as an alternative to an implementation using a computer 7 as shown in FIG. 9, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The invention claimed is:

1. A computer-implemented method comprising:

obtaining at least one document to be classified, the at least one document containing textual data;

classifying, using a machine learning model, the at least one document into at least two classes, the machine learning model including an artificial neural network, ANN, and an attention mechanism and the machine learning model being trained using a training dataset comprising:

a plurality of documents containing textual data, and information indicating which one of the at least two classes each one of the plurality of documents belongs to;

determining, for each of the at least one document, a confidence value of the classifying, based on one or more outputs of one or more nodes comprised in the ANN, the one or more outputs being obtained from the classifying, wherein the confidence value is determined based on:

one or more activation levels of the one or more nodes in a final layer of the ANN, a maximum predictive probability of one of the at least two classes, and a predictive uncertainty output by the machine learning model;

assigning, to each of the at least one document, based at least in part on the confidence value, one of at least two categories that are associated with different degrees of credibility of the classifying;

filtering the at least one document to exclude a document of the at least one document from further processing based on a respective confidence value of the document satisfying an upper confidence threshold or a lower confidence threshold; and providing, for output and after the filtering, one or more of the at least one document with:

the one of the at least two categories assigned to each of the one or more of the at least one document, and attention information that indicates significance of one or more parts of each document provided for display in the classifying of the document using the machine learning model, wherein each document of the one or more of the at least one document provided for output has a confidence value that does not satisfy the upper confidence threshold and does not satisfy the lower confidence threshold, wherein the one or more parts of each document are provided with at least one word-level indicator to cause display of an indication of a significance of at least one word based on one or more word-level vectors included in the attention information, and wherein the one or more parts of each document are provided with at least one sentence-level indicator to cause display of an indication of a significance of at least one sentence based on one or more sentence-level vectors included in the attention information.

2. The method according to claim 1, wherein, in the classifying, the machine learning model performs a binary classification with a first class of relevant documents and a second class of irrelevant documents.

3. The method according to claim 1, wherein the one or more of the at least one document provided for display is or are assigned to a specified one of the at least two categories.

4. The method according to claim 3, wherein the specified one of the at least two categories is associated with the lowest degree of credibility of the classifying.

5. The method according to claim 1, further comprising:

collecting the plurality of documents to be included in the training dataset, each one of the plurality of documents having been assigned to one of the at least two classes;

pre-processing the textual data contained in the plurality of documents;

generating, after the pre-processing, the training dataset comprising the plurality of documents and information indicating which one of the at least two classes each one of the plurality of documents belongs to; and training the machine learning model using the training dataset.

6. The method according to claim 1, wherein the machine learning model is trained further using a pretrained word embedding.

7. The method according to claim 1, wherein at least a part of the ANN included in the machine learning model forms a language model trained to determine a probability of a target word occurring, given one or more words surrounding the target word; and wherein the machine learning model is trained by:

fine-tuning the language model using textual data relating to a specified domain in which the plurality of documents included in the training dataset are comprised; and training the machine learning model to classify the plurality of documents comprised in the training dataset into the at least two classes.

8. The method according to claim 1, wherein the ANN included in the machine learning model comprises:

a recurrent neural network with an attention layer;

a hierarchical attention network; or a transformer network.

9. The method according to claim 1, wherein the confidence value is determined further based on:

a measure indicating whether the at least one document input to the ANN is an outlier with respect to the training dataset.

10. The method according to claim 1, wherein, in the providing for output of the one or more of the at least one document, the attention information is provided for display so as to display the one or more parts of each document in manners different from each other based on the significance of the respective part or parts indicated by the attention information.

11. The method according to claim 1, wherein the one or more parts of each document provided for display in the classifying of the document using the machine learning model include one or more of the following:

one or more words in the textual data contained in the document, the one or more words including the at least one word; or one or more sentences in the textual data contained in the document, the one or more sentences including the at least one sentence.

12. The method according to claim 1, wherein the at least one document to be classified and the plurality of documents comprised in the training dataset are patent documents.

13. A computer-implemented method comprising:

obtaining at least one document to be classified, the at least one document containing textual data;

classifying, using a machine learning model, the at least one document into at least two classes, the machine learning model including an artificial neural network, ANN, and an attention mechanism and the machine learning model being trained using a training dataset comprising:

a plurality of documents containing textual data, and information indicating which one of the at least two classes each one of the plurality of documents belongs to;

determining, for each of the at least one document, a confidence value of the classifying, based on one or more outputs of one or more nodes comprised in the ANN, the one or more outputs being obtained from the classifying of the at least one document using the machine learning model, wherein the confidence value is determined based on:

one or more activation levels of the one or more nodes in a final layer of the ANN, a maximum predictive probability of one of the at least two classes, and a predictive uncertainty output by the machine learning model;

assigning, to each of the at least one document, based at least in part on the confidence value, one of at least two categories that are associated with different degrees of credibility of the classifying;

filtering the at least one document to exclude a document of the at least one document from further processing based on a respective confidence value of the document satisfying an upper confidence threshold or a lower confidence threshold; and selecting one or more of the at least one document for further processing based on the filtering and one of the at least two categories assigned to each of the at least one document, wherein each document of the one or more of the at least one document selected for further processing has a confidence value that does not satisfy the upper confidence threshold and does not satisfy the lower confidence threshold providing, for display, the one or more documents of the at least one document with attention information that indicates significance, in the classifying, of one or more parts of each of the one or more documents of the at least one document provided for display, wherein the one or more parts of each document are provided with at least one word-level indicator to cause display of an indication of a significance of at least one word based on one or more word-level vectors included in the attention information, and wherein the one or more parts of each document are provided with at least one sentence-level indicator to cause display of an indication of a significance of at least one sentence based on one or more sentence-level vectors included in the attention information.

14. A computer-implemented method comprising:

obtaining at least one document to be classified, the at least one document containing textual data;

classifying, using a machine learning model, the at least one document into at least two classes, the machine learning model including an artificial neural network, ANN, and an attention mechanism and the machine learning model being trained using a training dataset comprising:

a plurality of documents containing textual data, and information indicating which one of the at least two classes each one of the plurality of documents belongs to;

identifying, for each of the at least one document, a confidence value associated with the classifying based on:

one or more activation levels of one or more nodes in a final layer of the ANN, a maximum predictive probability of one of the at least two classes, and a predictive uncertainty output by the machine learning model;

filtering the at least one document to exclude a document of the at least one document from further processing based on a respective confidence value of the document satisfying an upper confidence threshold or a lower confidence threshold; and providing for display, after the filtering and based on corresponding confidence values for one or more documents of the at least one document not satisfying the upper confidence threshold and not satisfying the lower confidence threshold, the one or more documents of the at least one document with attention information that indicates significance, in the classifying, of one or more parts of each of the one or more documents of the at least one document provided for display, wherein the one or more parts of each document are provided with at least one word-level indicator to cause display of an indication of a significance of at least one word based on one or more word-level vectors included in the attention information, and wherein the one or more parts of each document are provided with at least one sentence-level indicator to cause display of an indication of a significance of at least one sentence based on one or more sentence-level vectors included in the attention information.

15. A system comprising:

at least one storage medium configured to store a machine learning model including an artificial neural network, ANN, and an attention mechanism, wherein the machine learning model is trained using a training dataset comprising:

a plurality of documents containing textual data, and information indicating which one of at least two classes each one of the plurality of documents belongs to; and at least one processor in communication with the storage medium, the processor being configured to:

obtain at least one document to be classified, the at least one document containing textual data;

classify, using the machine learning model, the at least one document into the at least two classes;

determine, for each of the at least one document, a confidence value of the classifying, based on one or more outputs of one or more nodes comprised in the ANN, the one or more outputs being obtained from the classifying of the at least one document using the machine learning model, wherein the confidence value is determined based on:

one or more activation levels of the one or more nodes in a final layer of the ANN, a maximum predictive probability of one of the at least two classes, and a predictive uncertainty output by the machine learning model;

assign, to each of the at least one document, based at least in part on the confidence value, one of at least two categories that are associated with different degrees of credibility of the classifying;

filter the at least one document to exclude a document of the at least one document from further processing based on a respective confidence value of the document satisfying an upper confidence threshold or a lower confidence threshold; and provide, for output and after the filtering, one or more of the at least one document with:

the one of the at least two categories assigned to each of the one or more of the at least one document, and attention information that indicates significance of one or more parts of each document provided for display in the classifying of the document using the machine learning model, wherein each document of the one or more of the at least one document provided for output has a confidence value that does not satisfy the upper confidence threshold and does not satisfy the lower confidence threshold, wherein the one or more parts of each document are provided with at least one word-level indicator to cause display of an indication of a significance of at least one word based on one or more word-level vectors included in the attention information, and wherein the one or more parts of each document are provided with at least one sentence-level indicator to cause display of an indication of a significance of at least one sentence based on one or more sentence-level vectors included in the attention information.

16. The system according to claim 15, wherein the one or more of the at least one document provided for output is or are assigned to a specified one of the at least two categories, the specified one of the at least two categories being associated with the lowest degree of credibility of the classifying; and wherein, in the providing for output of the one or more of the at least one document, the attention information is provided for display so as to display the one or more parts of each document in manners different from each other based on the significance of the respective part or parts indicated by the attention information.

17. The system according to claim 15, wherein the at least one processor is further configured to:

collect the plurality of documents to be included in the training dataset, each one of the plurality of documents having been assigned to one of the at least two classes;

pre-process the textual data contained in the plurality of documents;

generate, after the pre-processing, the training dataset comprising the plurality of documents and information indicating which one of the at least two classes each one of the plurality of documents belongs to; and train the machine learning model using the training dataset.

18. A non-transitory computer-readable medium comprising instructions that, when executed, configure one or more hardware processors to perform a method comprising:

obtaining at least one document to be classified, the at least one document containing textual data;

classifying, using a machine learning model, the at least one document into at least two classes, the machine learning model including an artificial neural network, ANN, and an attention mechanism and the machine learning model being trained using a training dataset comprising:

a plurality of documents containing textual data, and information indicating which one of the at least two classes each one of the plurality of documents belongs to;

determining, for each of the at least one document, a confidence value of the classifying, based on one or more outputs of one or more nodes comprised in the ANN, the one or more outputs being obtained from the classifying of the at least one document using the machine learning model, wherein the confidence value is determined based on:

one or more activation levels of the one or more nodes in a final layer of the ANN, a maximum predictive probability of one of the at least two classes, and a predictive uncertainty output by the machine learning model;

assigning, to each of the at least one document, based at least in part on the confidence value, one of at least two categories that are associated with different degrees of credibility of the classifying;

filtering the at least one document to exclude a document of the at least one document from further processing based on a respective confidence value of the document satisfying an upper confidence threshold or a lower confidence threshold; and providing, for output and after the filtering, one or more of the at least one document with:

the one of the at least two categories assigned to each of the one or more of the at least one document, and attention information that indicates significance of one or more parts of each document provided for display in the classifying of the document using the machine learning model, wherein each document of the one or more of the at least one document provided for output has a confidence value that does not satisfy the upper confidence threshold and does not satisfy the lower confidence threshold, wherein the one or more parts of each document are provided with at least one word-level indicator to cause display of an indication of a significance of at least one word based on one or more word-level vectors included in the attention information, and wherein the one or more parts of each document are provided with at least one sentence-level indicator to cause display of an indication of a significance of at least one sentence based on one or more sentence-level vectors included in the attention information.

19. The non-transitory computer-readable medium according to claim 18, wherein the one or more of the at least one document provided for output is or are assigned to a specified one of the at least two categories, the specified one of the at least two categories being associated with the lowest degree of credibility of the classifying.

20. The non-transitory computer-readable medium according to claim 18, wherein, in the providing for display of the one or more of the at least one document, the attention information is provided for display so as to display the one or more parts of each document in manners different from each other based on the significance of the respective part or parts indicated by the attention information.

* * * * *